Dec. 12, 1967   D. H. LARSON ET AL   3,357,273
ANTI-BACKLASH GEAR AND ASSEMBLY
Filed April 13, 1966

Inventors:
Donald H. Larson
Werner H. Wachowiak
By: Hofgren, Wegner, Allen,
Stellman & McCord
Attorneys ns Patent Office 3,357,273
Patented Dec. 12, 1967

3,357,273
ANTI-BACKLASH GEAR AND ASSEMBLY
Donald H. Larson, Arlington Heights, and Werner H. Wachowiak, Rolling Meadows, Ill., assignors to Warwick Electronics Inc., a corporation of Delaware
Filed Apr. 13, 1966, Ser. No. 542,272
8 Claims. (Cl. 74—440)

ABSTRACT OF THE DISCLOSURE

A gear for use in an anti-backlash assembly characterized in that the gear has a plurality of recesses in one face and a plurality of slightly misaligned projections on the other face so that when two sets of gear members are assembled in facial juxtaposition with the projections of one member extending in the recesses of the other member, teeth on the periphery of the gear will be slightly misaligned relative to each other.

---

This invention relates to gear assemblies and more particularly to an improvement in anti-backlash gear assemblies.

A common problem in gear drive assemblies is that there is a slight amount of "play" present between the teeth of meshing gears. This play or "backlash" which exists between the teeth of driving and driven gears may be of little or no consequence except in those systems where a relatively fine or precise adjustment is sought to be achieved. For example, in wave signal receivers, such as television sets, the commonly known "fine tuning" adjustment is one in which a slight amount of movement imparted to the tuning shaft may substantially change the presentation of the signal received. In such cases, the inherent backlash in the gear system utilized to drive the fine tuning apparatus may create some play or lost motion. Such play is undesirable and complicates efforts to display the best presentation of the signal being received.

The typical solution to this problem of backlash is to mount two gears in tandem on a single drive shaft with the teeth of the two gears slightly misaligned relative to each other so that the spacing between the teeth of the driven gear will be substantially filled by the offset of the teeth of the two driving gears. In most of the prior art structures utilizing this concept, the offset between the teeth of the two tandem gears has been obtained through the use of offset pin-like fastening means which extends through the two gears to create the offset, threaded fasteners having eccentric projections or deformable pin or spring means.

This invention is directed to the provision of a gear to be used in an anti-backlash assembly which may be juxtaposed with another identical gear and, when held in such juxtaposition, will produce an offset between the teeth of the two gears without the aid of any independent element extending through the gears.

It is therefore a primary object of this invention to provide an improved anti-backlash gear assembly.

It is the general object of this invention to provide an improvement in anti-backlash gear assemblies wherein the gear element is provided with self-contained structure which is constructed and arranged so that when two such elements are facially juxtaposed, the teeth of the two elements will be offset slightly relative to each other in a suitable anti-backlash fashion.

It is another object of this invention to provide an anti-backlash gear assembly as described above which eliminates the need for separate elements extending through the gear members to create and/or maintain the relative offset of the gear members.

Other objects, features and advantages of the present invention will be apparent from the following description of the preferred embodiments illustrated in the accompanying drawings, in which.

Figure 1:
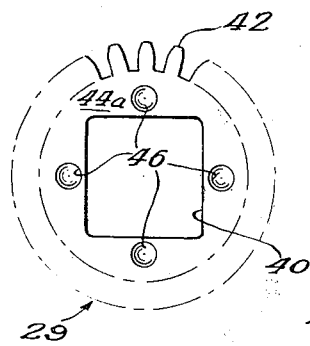
FIGURE 1 is a front elevational view of a gear utilized in the anti-backlash gear assembly of this invention.
Figure 2:
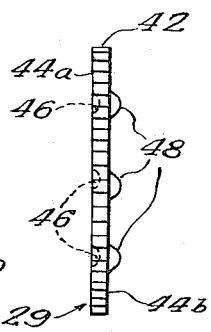
FIGURE 2 is a side elevational view of the gear shown in FIGURE 1.
Figure 3:
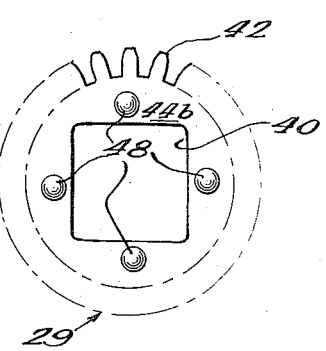
FIGURE 3 is a rear elevational view of the gear shown in FIGURE 1.
Figure 4:
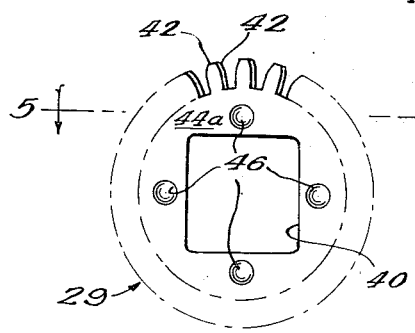
FIGURE 4 is a front elevational view of two of the gears shown in FIGURE 1 mounted in facial juxtaposition showing the relative offset produced between the teeth of the two gears.
Figure 5:
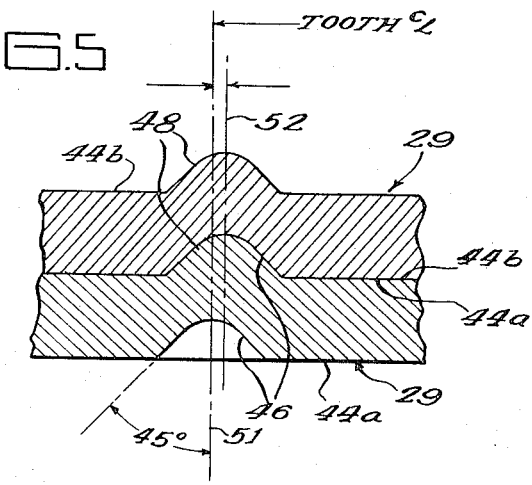
FIGURE 5 is a fragmentary enlarged sectional view taken along the line 5—5 of FIGURE 4 showing in greater detail the mating recesses and projections formed in the faces of the gears and the offset between the recesses and projections.
Figure 6:
FIGURE 6 is a fragmentary enlarged view of a portion of FIGURE 4 showing in greater detail the offset between the teeth of the two gears.
Figures 7, 8:
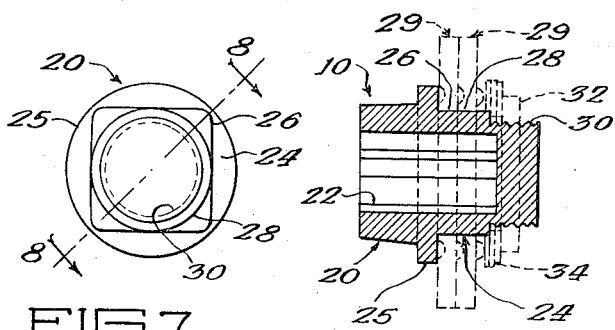
FIGURE 7 is an end elevational view of the hub on which the gears shown in FIGURES 1 through 6 are mounted.
FIGURE 8 is a sectional view taken along the line 8—8 of FIGURE 7 and also showing the gears in phantom outline mounted on the hub.

Gear assembly 10 of this invention includes a hub 20 which is provided with a bore 22 constructed and arranged for non-rotating attachment to the end of a shaft. The hub is provided with a gear receiving portion 24 which includes a first enlarged backing surface 25, a second gear mounting surface 26, and a third gear receiving surface 28. Preferably the backing surface 25 is enlarged relative to the surfaces 26 and 28 to provide an axial limit means for the gears to be telescoped over surfaces 26 and 28.

Gear receiving surface 26 is preferably provided with a configuration which will generally mate with a portion of gear 29 so as to mount the gear in a non-rotatable fashion relative to hub 20. In the preferred embodiment, surface 26 has a generally square cross-sectional configuration.

Surface 28 is formed so as to permit rotation of a gear 29 relative to the hub 20. In the preferred embodiment, this surface is generally circular in cross-section, having a diameter which equals the cross-sectional dimension of surface 26.

Hub 20 is provided with a reduced threaded portion 30 beyond surface 28 for receiving a suitable fastening means such as a nut 32. Spring-like washers 34 may be interposed between nut 32 and gear 29 thereby providing a means for holding the gears 29 on hub 20 in abutment with backing surface 25 and in facial juxtaposition with each other.

Gears 29 are each provided with substantially square central openings 40 which generally mate with portion 25 of hub 20. The gears are formed with the usual toothed periphery 42 and substantially flat opposed faces 44a and 44b. One face of the gears, such as face 44a, is provided with a plurality of recesses or pockets 46. The opposite face, such as face 44b, has a plurality of upstanding projections or bumps 48.

The recesses and projections are preferably of a size and shape so as to mate with each other when two such gears are facially juxtaposed. However, the center line 51 of each of the recesses 46 (as drawn on a radius) is slightly offset from the center line 52 of each of the projections 48. In the preferred embodiment, this offset is approximately 1¼ degrees. Therefore, when the two gears are facially juxtaposed, this slight 1¼ degrees offset of the several recesses relative to the several projections, will cause a slight radial misalignment of the teeth of the gears. In this manner, two such gears 29 facially juxtaposed with each other may present a toothed periphery which generally spans the spaces between the teeth of an adjacent meshing gear, thereby minimizing or substantially eliminating any backlash which may occur in the system.

In assembly, one gear 29 is first telescoped over surface 26 and non-rotatably fixed by the generally mating association between that surface and opening 40 of the gear. The second gear 29 is free to rotate relative to surface 28 and may be facially juxtaposed against the first gear until the projections 48 of the second gear engage in the pockets 46 of the first gear with the resultant slight offset in the teeth of the two gears. Then the washers and nut are threaded onto the assembly to hold the gears in facial juxtaposition.

Preferably each gear 29 is formed of nylon or a similar material, such as that known as "Delrin" so that the gear is somewhat resilient and has very smooth surfaces with a low coefficient of friction. Furthermore, the mating recesses and projections 46 and 48, respectively, may form slightly yieldable minute cam surfaces so that the two such gears may rotate slightly relative to each other when a turning load or torque is applied to the shaft on which the gears are mounted to drive another gear. In this manner, the gear assembly may slightly adjust to compensate for different gears having different spans or dimensions between the teeth. This relative movement between the two gears will also produce some slight axial movement which is accommodated by the spring washer 34 located between the gears and the nut 32.

The gear assembly of this invention provides an extremely simple, virtually fool-proof assembly which eliminates the need for separate fastening elements passing between each of the gears to create the relative offset between the gear teeth. Moreover, all of the gears are identical and need merely be assembled in the aforedescribed telescoping fashion to produce the resultant anti-backlash gear tooth misalignment.

The foregoing detailed description has been given for clearness of understanding only, and no unnecessary limitations should be understood therefrom, as some modifications may be obvious to those skilled in the art.

We claim:

1. An anti-backlash gear, comprising: a gear member having a generally toothed peripheral edge and a generally centrally located opening for assembling the gear member on a shaft, said gear member having a plurality of recesses in one face and a plurality of slightly misaligned projections on the other face so that when two such gear members are assembled in facial juxtaposition with the projections of one member extending into the recesses of the other member, the teeth of the peripheral edge are slightly misaligned relative to each other.

2. The gear of claim 1 wherein each recess and its opposite projection are positioned at substantially the same distance from the center of the gear but are slightly circumferentially misaligned relative to each other.

3. The gear of claim 2 wherein the recesses and projections are of generally mating dimension so that two such gears may be assembled in facial engagement with each other.

4. A gear assembly for attachment to a shaft, comprising: a first hub member constructed and arranged for attachment to said shaft; a pair of substantially identical gear members telescoped on said hub member, each of said gear members having a plurality of surface interruptions in one face and a plurality of substantially mating surface projections on the other face, said projections and interruptions being slightly misaligned relative to each other; and means for securing the gear members on the hub in facial engagement with each other with the projections of one gear member extending into the surface interruptions in the face of the other member to slightly misalign the teeth of the two gear members.

5. The gear assembly of claim 4 wherein said gears are provided with a central opening and said hub is provided with a gear receiving surface including a first portion constructed and arranged to non-rotatably receive the gears and a second portion adjacent the first portion constructed and arranged to rotatably receive the gears whereby during assembly one gear will be fixed relative to the hub and the other gear may be rotated relative to the hub and first gear to obtain the desired positional registration of the two gears.

6. The gear assembly of claim 5 wherein said projections and interruptions form mating cam surfaces to afford slight relatively rotational movement of the two assembled gears to fill a gap between the teeth of a meshing gear responsive to a turning force applied to said shaft.

7. The gear assembly of claim 6 wherein the gears are held on a hub by means permitting slight axial movement of the gears relative to each other to permit the relative rotation between the two gears so that the gears may span the space between the teeth of a meshing gear.

8. The gear assembly of claim 4 wherein the hub is also provided with an axial limit surface and a fastening means receiving surface adjacent said gear receiving surface so that the gear members may be positioned on said gear receiving surface and held against substantial movement axially of the hub by confinement between said limit surface and fastening means secured on said fastening surface.

References Cited

UNITED STATES PATENTS

| | | | |
|---|---|---|---|
| 3,037,396 | 6/1962 | Martin | 74—440 X |
| 3,127,784 | 4/1964 | O'Neill | 74—440 |
| 3,138,035 | 6/1964 | Sivaslian | 74—440 |

DONLEY, J. STOCKING, *Primary Examiner.*

L. H. GERIN, *Assistant Examiner.*